United States Patent [19]
Margolis et al.

[11] Patent Number: 5,390,118
[45] Date of Patent: Feb. 14, 1995

[54] AUTOMATIC LATERAL GUIDANCE CONTROL SYSTEM

[75] Inventors: Donald Margolis, El Macero; Yoshiyuki Yasui, Davis, both of Calif.

[73] Assignee: Aisin Seiki Kabushiki Kaisha, Kariya, Japan

[21] Appl. No.: 156,944

[22] Filed: Nov. 24, 1993

Related U.S. Application Data

[63] Continuation of Ser. No. 701,509, May 16, 1991, abandoned, which is a continuation-in-part of Ser. No. 592,295, Oct. 3, 1990, abandoned.

[51] Int. Cl.$^6$ ............................................. G06F 15/50
[52] U.S. Cl. .................................. 364/424.02; 180/168
[58] Field of Search ................ 364/424.02, 436, 449; 356/138, 152; 180/167, 168, 169, 141, 142

[56] References Cited

U.S. PATENT DOCUMENTS

| | | | |
|---|---|---|---|
| H341 | 10/1987 | Monegan . | |
| 3,172,496 | 3/1965 | Rainbow et al. | 180/168 |
| 3,443,071 | 5/1969 | Mori . | |
| 3,466,451 | 9/1969 | Hanchett, Jr. . | |
| 3,619,618 | 11/1971 | Thorn | 318/640 |
| 3,708,668 | 1/1973 | Tilley | 250/202 |
| 3,723,012 | 3/1973 | Storck et al. | 356/152 |
| 3,802,780 | 4/1974 | Helm et al. | 350/152 |
| 3,881,568 | 5/1975 | Ando | 180/168 |
| 3,918,172 | 11/1975 | Moreau | 356/4 |
| 3,970,840 | 7/1976 | DeBruine | 180/168 |
| 4,007,991 | 2/1977 | Robertsson | 356/141 |
| 4,049,961 | 9/1977 | Marcy | 180/169 |
| 4,069,888 | 1/1978 | Wolters et al. | 180/169 |
| 4,070,584 | 1/1978 | Chartraire et al. | 250/555 |
| 4,099,591 | 7/1978 | Carr | 180/168 |
| 4,111,552 | 9/1978 | Bodlaj | 356/4 |
| 4,136,949 | 1/1979 | Hayamizu et al. | 356/1 |
| 4,149,143 | 4/1979 | Nagano et al. | 382/53 |
| 4,157,533 | 6/1979 | Duvall | 346/154 |
| 4,160,237 | 7/1979 | McMahon | 382/66 |
| 4,168,908 | 9/1979 | Cubalchini | 356/152 |
| 4,180,322 | 12/1979 | Farcinade | 356/1 |
| 4,181,430 | 1/1980 | Shirota et al. | 356/1 |
| 4,615,615 | 10/1986 | Krolak et al. | 356/1 |
| 4,630,109 | 12/1986 | Barton | 180/168 |
| 4,632,543 | 12/1986 | Endo | 356/5 |

(List continued on next page.)

FOREIGN PATENT DOCUMENTS

| | | |
|---|---|---|
| 0354561A2 | 2/1990 | European Pat. Off. . |
| 0361914 | 4/1990 | European Pat. Off. . |
| 60-250410 | 12/1985 | Japan . |
| 2130445A | 11/1984 | United Kingdom . |

OTHER PUBLICATIONS

Liu, Sijiu M. and Frank, Andrew A., "On Lateral Control of Highway Vehicles Guided by A Forward Looking Sensor", Dept. of Mech. Eng., Univ. of Calif.

(List continued on next page.)

Primary Examiner—Vincent N. Trans
Attorney, Agent, or Firm—Banner, Birch, McKie and Beckett

[57] ABSTRACT

An improved automatic lateral guidance control system for guiding moving vehicles is provided which includes a sensing subsystem for viewing an area in front of a vehicle, a plurality of energy radiating or energy reflective devices disposed adjacent a predetermined length of road, an apparatus for translating the radiated or reflected information from the viewed area into coordinate data representing an approximation of the predetermined path along the road, and a vehicle controller for determining the vehicle's heading with respect to the approximated path and providing an output control signal to correct the vehicle's heading with respect to the approximated path. The system uses past and present position data to calculate a predetermined path for the vehicle. Gain factors and comfort factors are determined to maximize comfort to passengers of the system and to optimize performance of the system.

34 Claims, 13 Drawing Sheets

U.S. PATENT DOCUMENTS

| | | | |
|---|---|---|---|
| 4,181,435 | 1/1980 | Williamson et al. | 356/141 |
| 4,184,767 | 1/1980 | Hughes et al. | 356/152 |
| 4,185,919 | 1/1980 | Williamson et al. | 356/141 |
| 4,187,027 | 2/1980 | Bjorklund et al. | 356/400 |
| 4,195,425 | 4/1980 | Leitz et al. | 356/28 |
| 4,218,138 | 8/1980 | Robertsson | 356/152 |
| 4,225,226 | 9/1980 | Davidson et al. | 364/449 |
| 4,227,261 | 10/1980 | Robertsson | 359/109 |
| 4,227,807 | 10/1980 | Pond et al. | 356/152 |
| 4,227,812 | 10/1980 | Pirlet | 356/372 |
| 4,259,009 | 3/1981 | Jernigan | 356/1 |
| 4,269,512 | 5/1981 | Nosler | 356/375 |
| 4,278,142 | 7/1981 | Kono | 364/424.02 |
| 4,309,758 | 1/1982 | Halsall et al. | 364/424.02 |
| 4,313,654 | 2/1982 | Matsui et al. | 354/403 |
| 4,314,761 | 2/1982 | Reymond et al. | 356/141 |
| 4,333,147 | 6/1982 | Regneiro et al. | 364/424.02 |
| 4,349,277 | 9/1982 | Mundy et al. | 356/1 |
| 4,373,804 | 2/1983 | Pryor et al. | 356/1 |
| 4,383,230 | 5/1983 | Endo | 333/214 |
| 4,387,988 | 6/1983 | Matsuda et al. | 356/1 |
| 4,395,121 | 7/1983 | Nory et al. | 356/152 |
| 4,401,886 | 8/1983 | Pond et al. | 250/203.1 |
| 4,419,011 | 12/1983 | Matsuda et al. | 356/1 |
| 4,425,043 | 1/1984 | Van Rosmalen | 356/375 |
| 4,436,418 | 3/1984 | Morino | 356/1 |
| 4,441,810 | 4/1984 | Momose et al. | 356/1 |
| 4,443,103 | 4/1984 | Erdmann et al. | 356/152 |
| 4,445,029 | 4/1984 | Nagaoka et al. | 250/201.4 |
| 4,456,829 | 6/1984 | Fohey | 250/560 |
| 4,477,184 | 10/1984 | Endo | 356/141 |
| 4,484,069 | 11/1984 | Brenholdt | 356/1 |
| 4,486,095 | 12/1984 | Mitchelson | 356/152 |
| 4,497,065 | 1/1985 | Tisdale et al. | 382/1 |
| 4,498,768 | 2/1985 | Holl | 356/161 |
| 4,502,782 | 3/1985 | Werner et al. | 356/5 |
| 4,511,248 | 4/1985 | Abbas | 356/4 |
| 4,514,083 | 4/1985 | Fukuoka | 356/1 |
| 4,515,471 | 5/1985 | Eden | 356/5 |
| 4,515,472 | 5/1985 | Welch | 356/5 |
| 4,538,907 | 9/1985 | Rocchi | 356/1 |
| 4,552,456 | 11/1985 | Endo | 356/5 |
| 4,556,313 | 12/1985 | Miller, Jr. et al. | 356/1 |
| 4,566,032 | 3/1986 | Yoshimura et al. | 180/168 |
| 4,569,078 | 2/1986 | Zuk | 382/1 |
| 4,575,237 | 3/1986 | Suzuki | 356/1 |
| 4,580,250 | 4/1986 | Kago et al. | 367/112 |
| 4,644,146 | 2/1987 | Wurster | 250/202 |
| 4,647,784 | 3/1987 | Stephens | 250/561 |
| 4,652,107 | 3/1987 | Tamura | 354/403 |
| 4,660,970 | 4/1987 | Ferrano | 356/1 |
| 4,668,859 | 4/1987 | Winterer | 180/169 |
| 4,673,817 | 6/1987 | Oomen | 250/561 |
| 4,685,800 | 8/1987 | Paquet | 356/152 |
| 4,700,301 | 10/1987 | Dyke | 364/424.02 |
| 4,703,240 | 10/1987 | Yoshimoto et al. | 180/168 |
| 4,703,820 | 11/1987 | Reinaud | 250/202 |
| 4,706,195 | 11/1987 | Yoshino et al. | 364/424.02 |
| 4,716,298 | 12/1987 | Etoh | 250/561 |
| 4,721,385 | 1/1988 | Jelalian et al. | 356/5 |
| 4,721,386 | 1/1988 | Collyer | 356/152 |
| 4,727,492 | 2/1988 | Reeve et al. | 364/424.02 |
| 4,729,660 | 3/1988 | Tsumura | 180/169 |
| 4,734,572 | 3/1988 | Gorman | 250/202 |
| 4,752,964 | 6/1988 | Okada et al. | 382/1 |
| 4,761,561 | 8/1988 | Fujiwara et al. | 250/548 |
| 4,769,700 | 9/1988 | Pryor | 348/120 |
| 4,770,526 | 9/1988 | Manhart et al. | 356/5 |
| 4,786,164 | 11/1988 | Kawata | 356/4 |
| 4,788,439 | 11/1988 | Hardy et al. | 250/561 |
| 4,790,402 | 12/1988 | Field et al. | 180/169 |
| 4,796,198 | 1/1989 | Boultinghouse et al. | 364/424.02 |
| 4,796,998 | 1/1989 | Soma et al. | 356/376 |
| 4,797,557 | 1/1989 | Ohman | 250/561 |
| 4,811,228 | 3/1989 | Hyyppa | 364/424.02 |
| 4,811,229 | 3/1989 | Wilson | 364/424.02 |
| 4,815,840 | 3/1989 | Benayad-Cherif et al. | 180/168 |
| 4,817,000 | 3/1989 | Eberhardt | 364/443 |
| 4,818,100 | 4/1989 | Breen | 356/5 |
| 4,818,887 | 4/1989 | Weishaupt | 350/561 |
| 4,834,531 | 5/1989 | Ward | 356/5 |
| 4,839,525 | 6/1989 | Kano et al. | 256/560 |
| 4,846,297 | 7/1989 | Field et al. | 180/169 |
| 4,855,915 | 8/1989 | Dallaire | 364/424.02 |
| 4,858,132 | 8/1989 | Holmquist | 364/424.02 |
| 4,876,444 | 10/1989 | Field | 180/169 |
| 4,877,311 | 10/1989 | Shernoff | 356/350 |

(List continued on next page.)

U.S. PATENT DOCUMENTS

| | | | |
|---|---|---|---|
| 4,878,754 | 11/1989 | Homma et al. | 356/376 |
| 4,895,440 | 1/1990 | Cain et al. | 356/5 |
| 4,902,126 | 2/1990 | Koechner | 180/169 |
| 4,903,054 | 2/1990 | Wible | 250/561 |
| 4,916,324 | 4/1990 | Meier | 250/561 |
| 4,918,607 | 4/1990 | Wible | 364/424.02 |
| 4,940,925 | 7/1990 | Wand et al. | 318/587 |
| 4,947,094 | 8/1990 | Dyer et al. | 364/424.02 |
| 4,970,653 | 11/1990 | Kenue | 364/424.02 |

OTHER PUBLICATIONS

Olson, Karl W., "Wire-Reference Configurations In Vehicle Lateral Control", IEEE Transactions on Vehicle Tech., vol. VT-26, No. 2, May 1977, pp. 161-172.

Kasselmann, J. T. and Keranen, T. W., "Adaptive Steering", (Source? Date??) pp. 26-35.

Shladover, S. E., Wormley, D. N., Richardson, H. H. and Fish, R., "Steering Controller Design For Automated Guideway Transit Vehicles", Journal of Dynamic Systems, Measurement, and Control, vol. 100, Mar. 1978, pp. 1-8.

Fenton, Robert E., Melocik, Grant C. and Olson, Karl W., "On The Steering Of Automated Vehicles: Theory And Experiment", IEE Transactions on Automatic Control, vol. AC-21, No. 3, Jun. 1976, pp. 306-315.

Fenton, Robert E. and Selim, Ibrahim, "On The Optimal Design Of An Automotive Lateral Controller", IEEE Transactions on Vehicular Technology, vol. 37, No. 2, May 1988, pp. 108-113.

Lee, Allan Y., "A Preview Steering Autopilot Control Algorithm For Passenger Vehicles", General Motors research publication GMR-6501, Nov. 1988.

European Search Report for EP 92810363.

T. Tsumura et al., *An Experimental System for Automatic Guidance of the Ground Vehicle by use of Laser and Corner Cubes,* 1984 Int'l Conf. on Indus. Electronics, at 297-302 (Oct. 22-26, 1984).

European Search Report for EP 91 11 6832.

AUTOMATIC LATERAL GUIDANCE CONTROL SYSTEM

CROSS REFERENCE TO RELATED APPLICATIONS

This application is a continuation of application Ser. No. 07/701,509, filed May 16, 1991, now abandoned, which is a continuation-in-part of Ser. No. 07/592,295, filed Oct. 3, 1990, now abandoned.

BACKGROUND OF THE INVENTION

1. Field of the Invention

The present invention generally relates to an automatic lateral guidance control system for controlling the direction of a moving vehicle along a predetermined path, and more particularly, to an improved vehicle controller for use in an automatic lateral guidance control system for controlling the direction of a motor vehicle on a highway. So-called "Automated Highways" are presently being contemplated, which will include vehicular-based systems that will automatically control the motor vehicle's speed, steering and braking, in order to substitute for the driver as a prime source of control over the vehicle. The expected advantages of such systems will be to improve the overall flow of traffic and increase highway safety. The present invention is directed to such a vehicular-based system for automatically controlling vehicle direction, which accurately guides a vehicle along a path while providing a comfortable ride for passengers.

2. Description of the Prior Art

A variety of conventional guidance systems are used for controlling the movement of vehicles travelling along a predetermined path such as, for example, robotic material handling guidance systems. In some applications, a "robotic vehicle" for moving materials between separate points in a warehouse or storage area without human intervention, is provided with an automated steering control system that utilizes an inductive sensor mounted near the bottom of the vehicle in order to sense a current passing through a thin wire disposed either at or below the surface of a predetermined pathway. The inductive sensor senses the magnetic field radiated from the wire and, using conventional phase-detection techniques, produces an output signal which indicates the extent to which the vehicle has drifted laterally from the desired course. The output signals from the sensor are provided to a vehicle control circuit that typically converts the sensor's output signal into control error signals which are used to direct the vehicle back on course.

These inductive types of lateral guidance control systems have experienced some success in relatively slow-moving, industrial materials handling applications. However, these systems are considered to have serious drawbacks when they are contemplated for controlling motor vehicles moving at appreciable speeds on a highway. For example, the magnetic field radiated by a current-conducting wire disposed in the surface of the road may be distorted by metallic structures along the roadway or by stray magnetic fields from nearby power lines. Such inductive sensors are highly prone to sensing spurious signals radiated by other electromagnetic sources. In addition, such a system requires the installation and maintenance of power cables, transformers and power supplies along the road, which add an appreciable cost to such a system. Furthermore, the performance of such a system is severely limited because the inductive sensor cannot "look-ahead" as a human driver does. Inductive sensor systems can only react to the magnetic field received from the roadway immediately beneath the vehicle. Consequently, without a "look-ahead" capability, the reaction times of the inductive sensor control systems are very slow in comparison with those of a driver.

In order to overcome the above-discussed disadvantages of the inductive sensor type vehicle guidance control systems, a number of automatic guidance systems have been proposed which use optical sensors to detect reflected beams of light energy from a reflector, reflective stripe or other light reflective medium disposed at the side of the road or applied to the road's surface. The vehicle's position and direction is then determined with respect to the reflector. An example of such a "look-ahead" technique is illustrated in U.S. Pat. No. 4,049,961 to Marcy. Marcy discloses an automatic guidance system for a motor vehicle which includes an optical laser transmitter/receiver assembly. A series of spaced-apart responders (i.e., light reflective devices) are disposed in a single row parallel to the centerline of the roadway, or in a pair of rows on opposite sides of the centerline, for reflecting radiant energy from the laser transmitter back to the receiver. As shown in Marcy, the laser transmitter radiates two overlapping beams which are amplitude-modulated by sine waves that are 180 degrees out of phase. The receiver merges the two reflected beams into a single beam that is subject to a cyclic translatory shift in amplitude. The amplitude shift is translated into a voltage whose amplitude varies in accordance with the position of the vehicle. In other words, a comparison of the phase differences between the transmitted and reflected beams provides a determination of the vehicle's location with respect to the reflectors. However, the use of such a system typically requires the use of a high powered laser transmitter, which can have a prohibitively high cost. More significantly, however, the conventional laser-controlled, automatic guidance systems have limited tracking performance or accuracy with respect to controlling the vehicle's direction, because such systems do not take into account the vehicle's speed. For example, the reaction time needed to steer the vehicle in response to sensed changes in the direction of the road increases as the vehicle's speed increases. Thus, although the conventional automatic guidance systems for motor vehicles may be considered "look-ahead" systems, the reaction time for the conventional systems is still limited at the higher vehicle speeds. Nevertheless, the present invention provides a novel arrangement for a "look-ahead" automatic lateral guidance control system that accounts for the speed of the vehicle and thereby increases the tracking performance and accuracy of the system, while providing a comfortable travelling environment.

SUMMARY OF THE INVENTION

Accordingly, it is an object of the present invention to provide an improved automatic guidance control system having an arrangement for automatically guiding the direction of a moving vehicle.

It is a further object of the present invention to provide an improved automatic guidance control system having an arrangement for increasing the reaction time available to control the direction of a moving vehicle.

It is yet another object of the present invention to provide an improved automatic guidance control system having an arrangement for automatically guiding the direction of a vehicle at higher vehicle speeds.

It is yet another object of the present invention to provide an improved automatic guidance control system for controlling the direction of a moving vehicle without the need for human intervention.

It is yet another object of the present invention to provide an improved automatic guidance control system having an arrangement for increasing the tracking accuracy of the system.

It is yet another object of the present invention to provide an improved automatic guidance control system having increased intelligence and sensitivity.

It is yet another object of the present invention to provide an improved automatic guidance control system having an arrangement for determining road geometry using past and present vehicle position information.

It is yet another object of the present invention to provide an improved automatic guidance control system which creates a more comfortable travelling environment for passengers.

It is yet another object of the present invention to provide an improved automatic guidance control system for controlling a moving vehicle which is more responsive than the control provided by an operator of the vehicle.

It is yet another object of the present invention to provide an improved automatic guidance control system that reduces operational maintenance and costs.

In accordance with the present invention, an improved automatic guidance control system for guiding moving vehicles is provided which includes a sensing subsystem for viewing an area in front of a vehicle, a plurality of energy radiating or energy reflective devices disposed adjacent a predetermined length of road an apparatus for translating the radiated or reflected information from the viewed area into coordinate data representing an approximation of the predetermined path along the road, and a vehicle controller for determining the vehicle's heading with respect to the approximated path and providing an output control signal to correct the vehicle's heading with respect to the approximated path. The system uses past and present marker and vehicle position data to calculate a predetermined path for the vehicle. Gain factors and human engineering factors are determined to maximize comfort to passengers of the vehicle and to optimize performance of the system.

BRIEF DESCRIPTION OF THE DRAWINGS

A more complete appreciation of the present invention and many of the attendant advantages thereof will be readily obtained as the invention becomes better understood by reference to the following detailed description when considered in connection with the accompanying drawings.

DETAILED DESCRIPTION OF THE PREFERRED EMBODIMENTS

Figure 1:
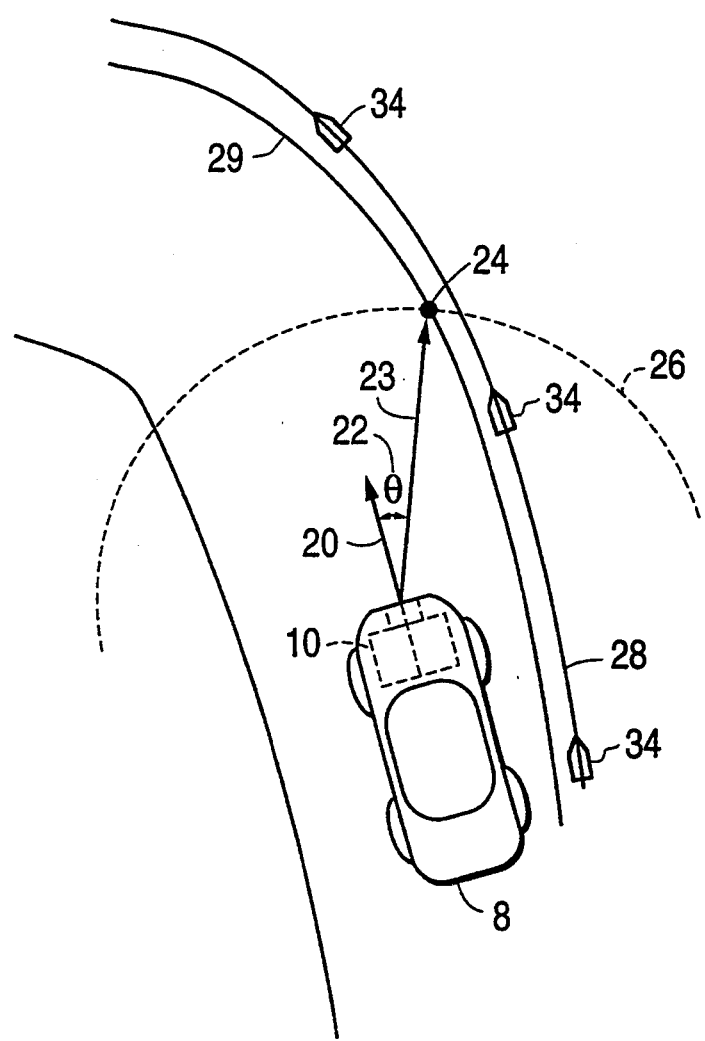
FIG. 1 is a schematic diagram of an improved automatic lateral guidance control system in accordance with a preferred embodiment of the present invention.
Figure 2:
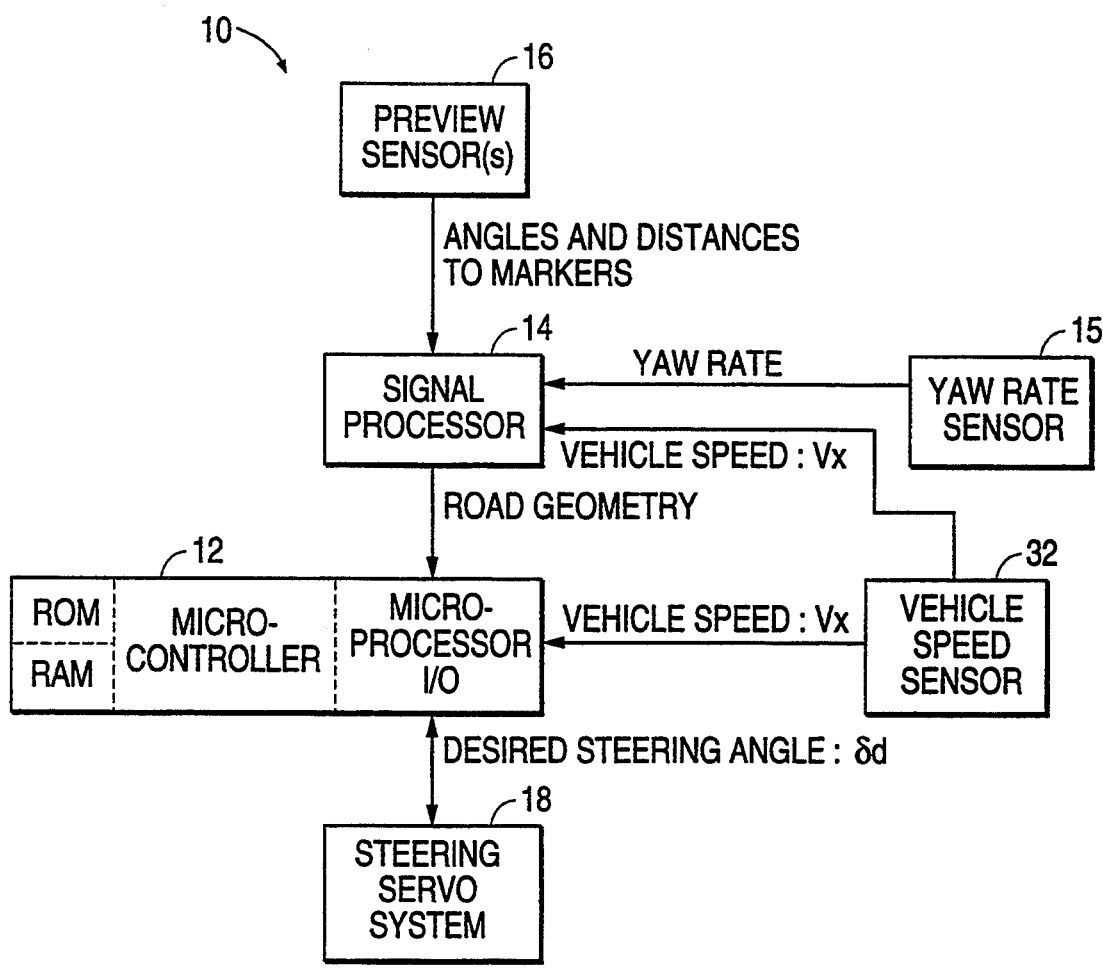
FIG. 2 is an overall functional block diagram of the improved automatic lateral guidance control system of FIG. 1.
Figure 3:
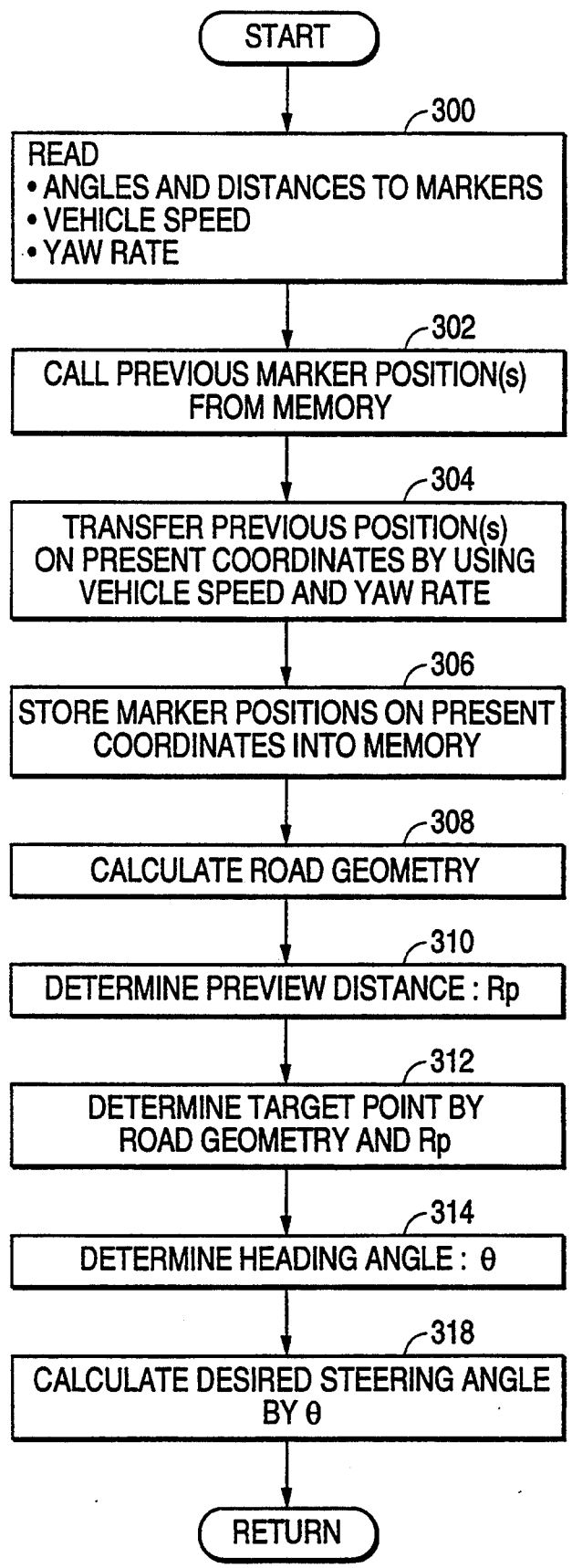
FIG. 3 illustrates a sequence of steps which may be performed to operate the improved automatic lateral guidance control system of FIGS. 1 and 2.

Referring to the drawings in detail, wherein like numerals indicate like elements, FIG. 1 is a schematic diagram of an improved automatic lateral guidance control system in accordance with a preferred embodiment of the present invention. Vehicle 8 is equipped with automatic lateral guidance control system 10 which automatically guides the heading or forward direction of vehicle 8 with respect to actual path 28. A plurality of reflectors 34 may be disposed adjacent to or along path 28. Although retroflectors which are well known in the art may be utilized for reflectors 34 in a preferred embodiment, the present invention is not intended to be limited thereto, and any suitable optical reflecting medium may be substituted for reflectors 34. By way of example only, a series of painted, reflective stripes may be disposed along (i.e., following the length of) path 28. Actual path 28 may comprise for example, a roadway, a lane of a highway or any other like predetermined route. Vehicle 8 may comprise for example, an automobile, truck, bus, or any other suitable type of mobile vehicle for travelling along a predetermined route such as path 28. Automatic lateral guidance control system 10, the structure and operation of which will be discussed in greater detail below, guides vehicle 8 in a generally forward direction along the forward, centerline axis of vehicle 8, which axis is hereinafter defined as vehicle heading 20. Automatic lateral guidance control system 10 adjusts the course of vehicle 8 in order to cause the vehicle to follow path 28. Generally, automatic lateral guidance control system 10 adjusts the course of vehicle 8 by determining the angular displacement between vehicle heading 20 and a straight line drawn from the front of vehicle 8 to selected target point 24, whereby target point 24 is a point located on ideal road geometry 29. As described in substantive detail below, ideal road geometry 29 is a calculated approximation of actual path 28. Vehicle 8 is then steered with respect to selected target point 24. Generally, the process of determining the vehicle's heading with respect to a selected target point on ideal road geometry 29, and correcting the vehicle's heading, is an iterative process which is performed by a sequence of steps programmed into a microcomputer. Consequently, the process of determining and correcting the vehicle's heading is continuously repeated as the vehicle travels along the roadway. Thus, the system illustrated in FIGS. 1, 2 and 3 is considered to comprise a continuum of target points 24 or "markers" disposed along ideal road geometry 29. Such a system is hereinafter referred to as a "continuous marker system." Additionally, ideal road geometry 29 is hereinafter defined to be an accurate approximation of the curvature of actual path 28. In essence, road geometry 29 is substantially equivalent to actual path 28. A preferred technique for calculating ideal road geometry 29 is discussed in substantive detail below.

FIG. 2 is an overall functional block diagram of the improved automatic lateral guidance control system of FIG. 1. Automatic lateral guidance control system 10 comprises vehicle speed sensor 32, preview sensors 16, yaw rate sensor 13, signal processor 14, microcontroller 12, and steering servo system 18. Microcontroller 12 comprises a microprocessor, read only memory (ROM), read access memory (RAM), and input/output ports (I/O ports). It should be understood that microcontroller 12 may also comprise any additional circuitry, such as A/D and D/A converters, combinational logic circuitry, latching circuitry, etc., that may be necessary for the operation and interconnection of microcontroller 12 with respect to the components of automatic lateral guidance control system 10. All of the above-described components of microcontroller 12 may be located on an individual semiconductor chip. In a preferred embodiment of the present invention, microcontroller 12 may comprise, for example, a Motorola MC68HC705C8 type microcontroller. Alternatively, a Digital Signal Processing Board, such as for example, a Texas Instruments TMS 320C30, may be utilized. Although the structure and operation of a specific type of microcontroller is described herein for illustrative purposes with respect to a preferred embodiment, the type of microcontroller selected is not critical to making and using the present invention, and the present invention is not intended to be limited thereto. Any suitable microcontroller or similarly constructed apparatus for performing the operations of the present invention may be substituted herein.

Referring to FIGS. 1 and 2, vehicle speed sensor 32 is coupled to microcontroller 12 and to signal processor 14 to provide a measurement of the speed of vehicle 8. Vehicle speed sensor 32 may comprise any of a number of conventional speed sensors for use in a motor vehicle such as, for example, a speed sensor connected to a wheel of vehicle 8. Preview sensors 16 are coupled to an input of signal processor 14 and provide measurements of the relative position, including distance and angle, of vehicle 8 with respect to at least one of reflectors 34 located along path 28. Yaw rate sensor 15 is coupled to an input of the signal processor 14 and provides measurements of the vehicle yaw rate information. An output from signal processor 14 is coupled to an input of microcontroller 12.

In a preferred embodiment, signal processor 14 operates to receive position measurements of reflectors 34 relative to the heading of vehicle 8 from preview sensors 16, to receive yaw rate information from yaw rate sensor 15 and to receive speed information from speed sensor 32. Signal processor 14 processes this information to calculate ideal road geometry 29 and provide ideal ==road geometry information to microcontroller 12. Alternatively, microcontroller 12 may calculate road geometry 29 directly from the angle and distance measurements provided by preview sensors 16, speed measurements provided by vehicle speed sensor and yaw rate information provided by yaw rate sensor 15.

Steering servo system 18 is coupled to microcontroller 12 and may, for example, comprise a conventional steering control system including a steering controller and steering actuator. Steering servo system 18 operates to change the direction of vehicle 8 in response to control signals generated by microcontroller 12, in order to maintain the heading of vehicle 8 with respect to path 28.

Preview sensors 16, which are electrically coupled to microcontroller 12 and signal processor 14, may be mounted on a right front portion of vehicle 8, for example, for use in a country (such as the United States) where vehicles typically travel on the right hand side of the road. Thus, preview sensors 16 may scan reflectors or other types of road markers disposed at or near the right hand side of the roadway. It is also envisioned that preview sensors 16 may be mounted in the center front portion of vehicle 8, in order to scan both sides of the roadway. Preview sensors 16 may comprise, for example, a laser transmitter/receiver (radar) system or other optical sensing apparatus, such as a video camera. It is to be noted that preview sensors 16 are described herein with respect to an optical sensing apparatus for illustrative purposes only, but the present invention is not intended to be limited thereto. Preview sensors 16 also may include other suitable sensing devices for determining angle and distance to each of a series of "markers" disposed adjacent to a roadway such as, for example, a receiver operating at radio-frequencies (RF) that detects and processes radiated signals from a series of RF "beacon" transmitters disposed adjacent to the road, or any other suitable sensing apparatus for sensing the distance and angle with respect to vehicle 8 and each of a series of energy reflecting or energy radiating "markers."The term "reflector" refers to any reflective medium for reflecting light energy. The term "marker" more broadly may refer either to an energy reflecting device or energy radiating device disposed adjacent to a roadway. The term "marker" may also refer to a section of material radiating a static magnetic field.

In a preferred embodiment utilizing a laser radar system, each transmitter of preview sensors 16 scans or radiates a beam of light to at least one of reflectors 34. The associated laser receiver of preview sensors 16 receives a reflected signal from each of scanned reflectors 34. Preview sensors 16 measure the distance and angle between each of scanned reflectors 34 and the heading of vehicle 8. This measurement information is provided to microcontroller 12 in order to determine the location of each of scanned reflectors 34 with respect to vehicle 8. This measurement information may be computed by preview sensors 16 by measuring a phase difference between the transmitted and received laser beams, or by using a pulsed laser beam and measuring propagation time to the reflector and back.

FIG. 3 illustrates a sequence of steps which may be performed to operate the improved automatic lateral guidance control system of FIGS. 1 and 2. In a preferred embodiment, this sequence of steps may be performed by programming microcontroller 12 using well-known programming techniques. Such programming techniques would be known to a computer programmer of ordinary skill. Referring to FIGS. 1, 2 and 3, preview sensors 16 measure the distance and angle between each of said reflectors (or markers) 34 and the heading of vehicle 8. Yaw rate sensor 15 measures the yaw rate of the vehicle. These measurements are provided to microcontroller 12 and/or signal processor 14, in order for either microcontroller 12 or signal processor 14 to determine the relative location of each of reflectors 34 with respect to vehicle 8. Preferably, preview sensors 16 scan an area that includes at least three of reflectors 34, although it is within the scope of the invention to scan an area of less than three reflectors. In block 300 of FIG. 3, the measurement information determining the relative position for each of the three scanned reflectors 34 with respect to vehicle 8 is read into the memory area of microcontroller 12. The vehicle speed information is also read into microcontroller 12 and/or signal processor 14 from vehicle speed sensor 32.

Figure 4:
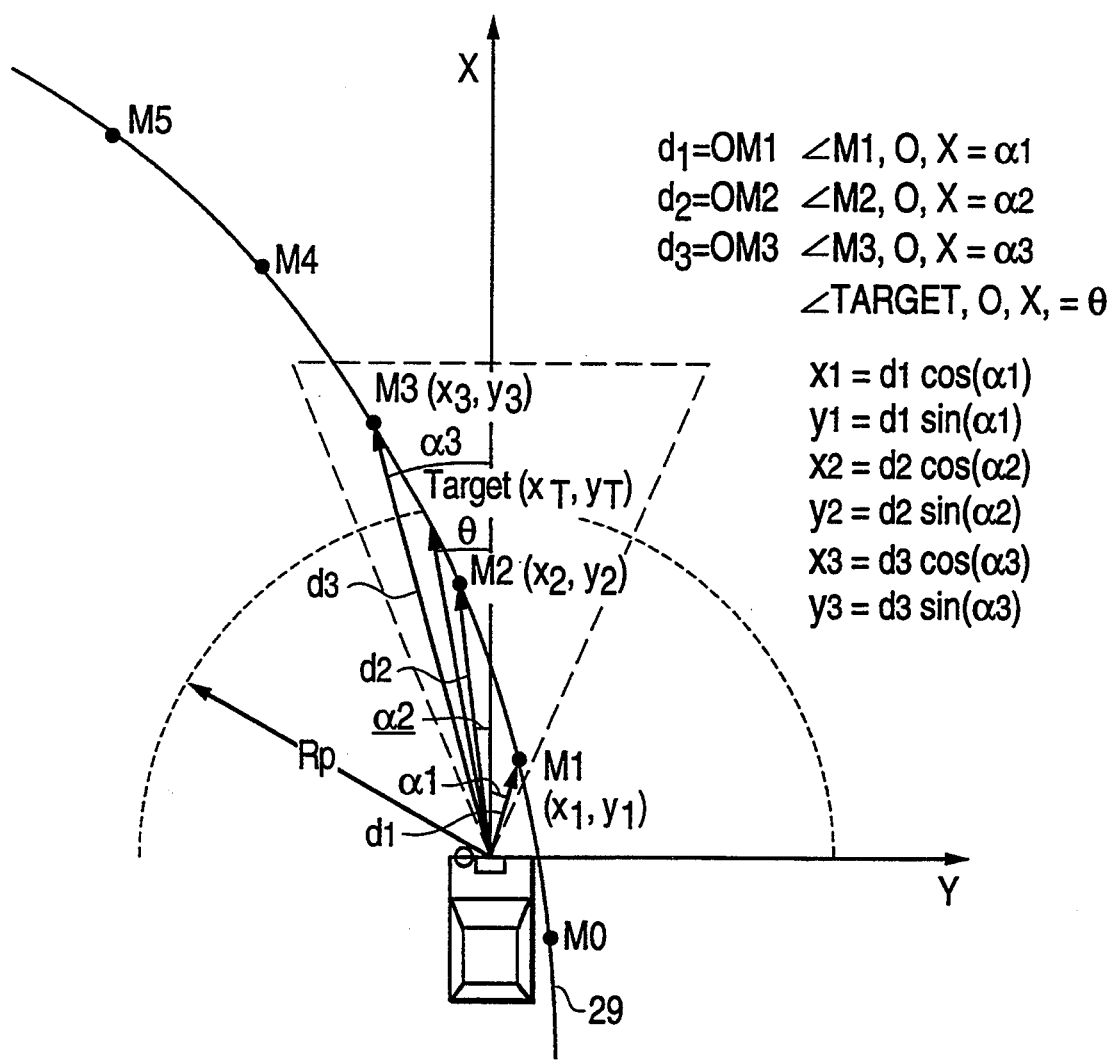
FIG. 4 is a schematic diagram illustrating a set of steps in FIG. 3 for calculating relative vehicle and marker position measurements.

FIG. 4 is a schematic diagram illustrating a set of steps to be performed with respect to block 300 in FIG. 3 for calculating angles and distances to markers. Referring to FIG. 4 and using well-known mathematical techniques, preview sensors 16 detect the angles and distances to at least three of reflectors M1, M2 and M3. As illustrated by example in FIG. 4, preview sensors 16 provide measurements of angles $\alpha1$, $\alpha2$ and $\alpha3$, and distances d1, d2 and d3 with respect to the scanned three of reflectors M1, M2 and M3. With respect to a Cartesian system of coordinates fixed on vehicle heading 20, the positions of the selected reflectors (or markers) M1, M2 and M3 are (x1, y1), (x2, y2) and (x3, y3). These positions are related to the angle and distance information provided by sensors 16 through the following set of equations:

$$(x1, y1) = (d1^*\cos(\alpha1), d1^*\sin(\alpha1))$$

$$(x2, y2) = (d2^*\cos(\alpha2), d2^*\sin(\alpha2))$$

$$(x3, y3) = (d3^*\cos(\alpha3), d3^*\sin(\alpha3)) \quad (1)$$

Figure 5:
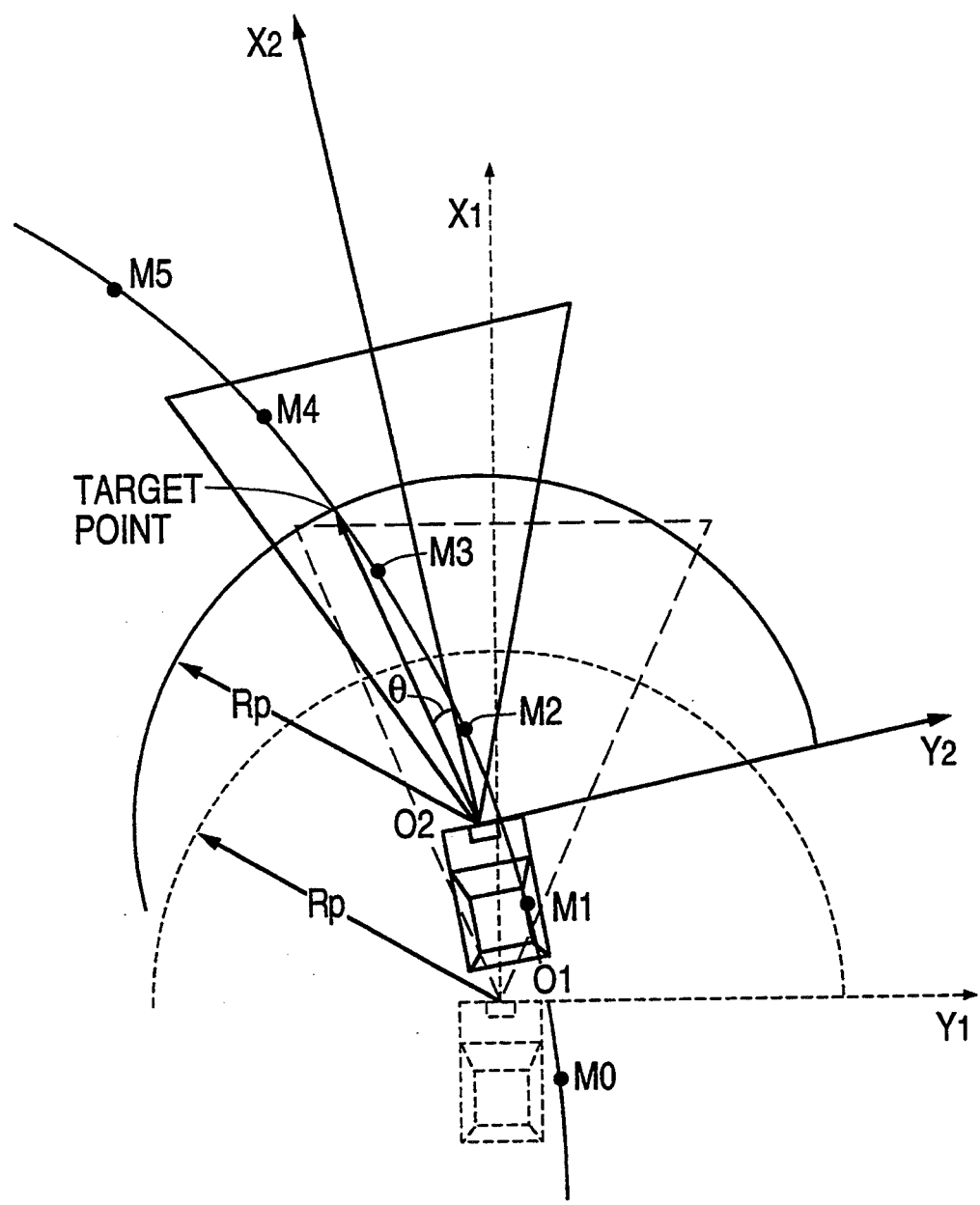
FIG. 5 illustrates a set of steps in FIG. 3 for calculating past and present relative vehicle and marker position measurements.

The method of estimating road geometry according to the instant invention utilizes both past and present relative vehicle and marker positional information in order to improve the system's sensitivity and accuracy. As illustrated in FIG. 5, solid lines indicate the present position of the vehicle. Dashed lines indicate a past position of the vehicle. The solid-lined vehicle scans at least three markers (M2, M3 and M4) to locate their positions in the $O_2X_2Y_2$ coordinate system (vehicle-body-fixed coordination). At a previous time, i.e., a few seconds before, the vehicle control system had located the position of marker M1, and had stored its positional information, with respect to the coordinate system $O_1X_1Y_1$, in RAM (memory) of microcontroller 12. Referring to block 302 of FIG. 3, this previous marker position M1 is recalled from memory and is converted, in block 304, to a position in the $O_2X_2Y_2$ coordinate system using the vehicle speed information ($V_x$) and the yaw rate information ($\Psi$).

Figure 6:
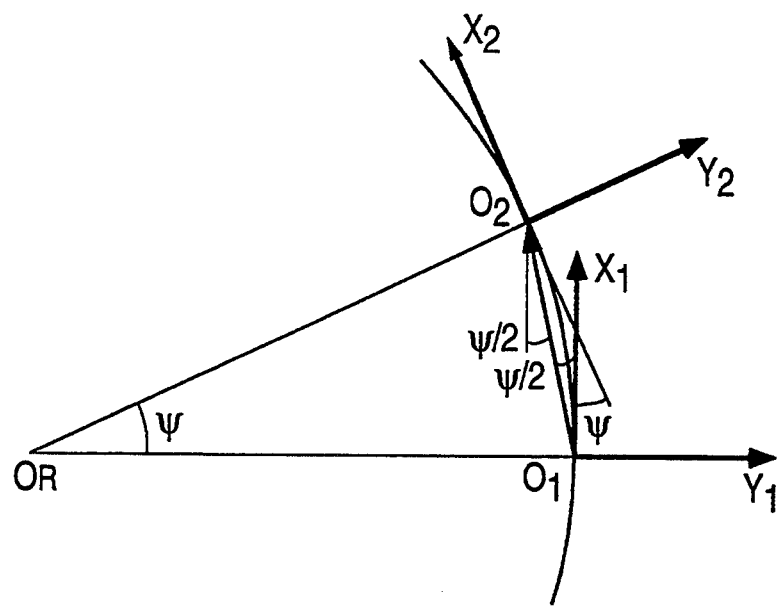
FIG. 6 illustrates the conversion of the past position measurements as shown in FIG. 5 from one coordinate system to another.

The coordinate system transfer of previous marker position M1 is shown in detail in FIG. 6. As can be seen in FIG. 6, the coordinates of a position in the coordinate system $O_1X_1Y_1$ will move a distance of $V_x \cdot \Delta t$ in a direction of $\Psi/2$-degrees and with a rotation of $\Psi$ degrees, where $\Psi$ is calculated as follows:

$$\Psi = \int \dot{\Psi} dt \quad (2)$$

Referring again to FIG. 3, block 306, marker positions on the vehicle-body-fixed coordinate system are stored into memory and are used, in block 308, to estimate road geometry in a calculation detailed below (Equations 3 and 4). According to preferred embodiment of the present invention, the road geometry is thus estimated using at least four marker positions (M1, M2, M3, M4). Additionally, the invention may be easily modified so that two or more previous marker positions may be stored in the control system memory and used for road geometry estimation. Thus, error due to missing markers is minimized and consequently, the system becomes more accurate, efficient and is more sensitive to changes in road geometry.

In block 308 of FIG. 3, microcontroller 12 calculates ideal road geometry 29 from the angle and distance measurement information obtained from preview sensor 16 and from both present and past marker positions. Ideal road geometry 29 is calculated as an accurate approximation of the curvature of path 28 with respect to the portion defined by the selected markers, by using the following equation for a circle:

$$(x-a)^2 + (y-b)^2 = R^2 \quad (3)$$

where (a, b) are the coordinates of the center of the curvature for the circle, and R is the radius of curvature of the circle. The values of a, b and R are then calculated by the following set of simultaneous equations:

$$(x1-a)^2 + (y1-b)^2 = R^2$$

$$(x2-a)^2 + (y2-b)^2 = R^2$$

$$(x3-a)^2 + (y3-b)^2 = R^2$$

$$(x4-a)^2 + (y4-b)^2 = R^2 \quad (4)$$

Alternatively, it is presently envisioned that ideal road geometry 29 may also be determined by signal processor 14. Signal processor 14 may also approximate the curvature of a portion of path 28 which has been scanned by preview sensors 16. Utilizing the angle and distance measurements with respect to scanned markers or reflectors 34, signal processor 14 provides x, y coordinate information with respect to the position and heading of vehicle 8 and path 28, which represents an accurate approximation of the curvature of path 28 (i.e., ideal road geometry). An advantage of the approximation technique used in signal processor 14 over conventional techniques is that the calculations for determining the ideal road geometry are performed with the assistance of so-called "neural network" computer technology. For example, a set of functions approximating the curvature of path 28 is constructed on a neural network computer, which is typically a general purpose computer. These functions are "learned" by the computer by experimentally constructing functions that satisfy known input and output data. Signal processor 14 is programmed with the learned functions developed by the neural network computer. Signal processor 14 then provides coordinate values to microcontroller 12 that allow microcontroller 12 to determine the position and heading of vehicle 8 with respect to the approximated curvature of path 28 (i.e., ideal road geometry) that has been derived by signal processor 14. However, it is to be noted that for the preferred embodiment of the present invention, microcontroller 12 may calculate ideal road geometry independently of any information to be provided from signal processor 14, and the use of signal processor 14 is presently considered only as an alternative or possible option for calculating ideal road geometry 29 which is not critical to making or using the present invention.

Referring now to block 310 in FIG. 3, microcontroller 12 next determines preview distance 23. The determination of preview distance is necessary in order to increase the reaction time available for guidance control system 10 to correct heading angle 22 in response to variations in the curvature of path 28. Preview distance 23 is a distance projected from the front of vehicle 8, and is defined as the radius of half-circle 26. The length of preview distance 23 is a function of the speed of vehicle 8. The actual values for preview distance 23 are determined by experimentation, because the selection of optimum values for preview distance 23 is a trade-off between ride comfort in the vehicle and control system performance. Consequently, the values determined for preview distance 23 must be compatible with both ride comfort and system performance. However, these values may be readily determined by system designers of ordinary skill. Finally, preview distance 23 must be sufficient to allow automatic lateral guidance control system 10 sufficient reaction time to determine heading angle 22 and to calculate the desired steering angle to be provided to steering servo system 18.

In block 312, microcontroller 12 determines target point 24 based on the length of preview distance 23. Target point 24 is determined as the intersection of the radius of half-circle 26 (i.e., the length of preview distance 23) with road geometry 29. Automatic lateral guidance control system 10 as depicted in FIGS. 1, 2 and 3, is defined as a continuous marker system because target point 24 may occur at any location along calculated road geometry 29. Thus, the target point may intersect a point on the approximated path even though no reflector or marker is actually located at that point. The locus of points defined by half-circle 26 is determined by the following equation:

$$x^2 + y^2 = R_p^2 \quad (5)$$

where $R_p$ is preview distance 23. Target point 24 is the intersection point $(x_t, Y_t)$ defined by the solutions to equations (4) and (5) above.

In block 314, microcontroller 12 calculates heading angle 22. Heading angle 22 is the angle between vehicle heading 20 and a straight line from vehicle 8 to target point 24. Heading angle 22 may be calculated according to any well known mathematical technique used for calculating angles. For example, heading angle 22 may be calculated with respect to FIG. 4, by the following equation:

$$\theta = \tan^{-1}\left(\frac{y_t}{x_t}\right) \quad (6)$$

where $\theta$ is heading angle 22.

In block 318, microcontroller 12 calculates the desired steering angle to be provided to steering servo system 18, based on heading angle 22. This step is performed by adjusting heading angle 22 to steer vehicle 8 towards target point 24. Consequently, microcontroller 12 must provide a desired steering angle as an output to steering servo system 18 that causes vehicle 8 to steer in the direction of target point 24. Desired steering angle $\delta_d$ is calculated from the following equation:

$$\delta_d = K * \theta \quad (7)$$

where K is the control gain, or feedback gain, of the system. Control gain K is a function of vehicle speed and the curvature of the path being followed. The actual values for control gain K can be determined by experimentation, because the selection of optimum values for control gain K is a trade-off between vehicle speed and the curvature of the path being followed. Consequently, the values determined for control gain K must be compatible with vehicle speed and path curvature. However, these values may be readily determined by system designers of ordinary skill.

Figure 7:
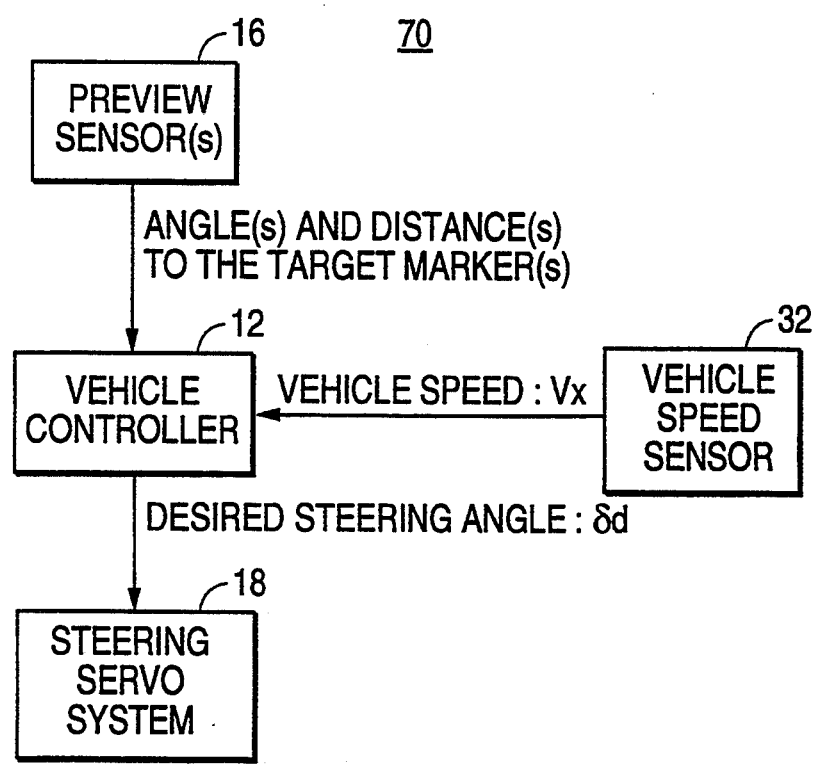
FIG. 7 is a block diagram of an improved automatic lateral guidance control system in accordance with a second embodiment of the present invention.

FIG. 7 is a block diagram of an improved automatic lateral guidance control system in accordance with a second embodiment of the present invention. Referring to FIG. 7, automatic lateral guidance control system 70 comprises microcontroller 12, preview sensors 16, vehicle speed sensor 32, and steering servo system 18. Signal processor 14, which is utilized in the embodiment illustrated by FIGS. 1, 2 and 3, is not utilized in the present embodiment. This embodiment provides an alternative structure to automatically guide a vehicle along a predetermined path. In the present embodiment, automatic lateral guidance control system 70 provides a desired steering angle $\delta_d$ for controlling the heading of vehicle 8, by calculating a heading angle with respect to the position of a discrete reflector. Hence, the present embodiment is hereinafter called a "discrete marker system" of control, as opposed to the "continuous marker system" disclosed in the first embodiment.

Figure 8:
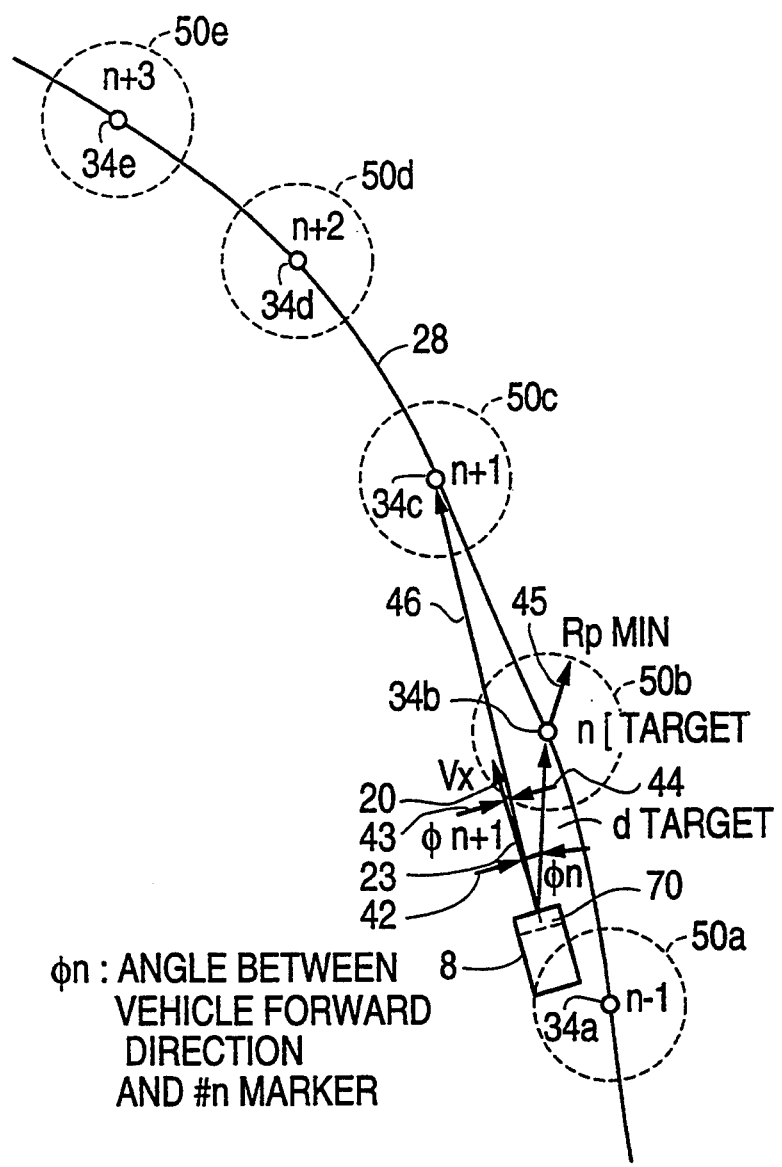
FIG. 8 illustrates the improved automatic lateral guidance control system of FIG. 7 operating with respect to a predetermined path.

FIG. 8 illustrates the improved automatic lateral guidance control system of FIG. 7 with vehicle 8 travelling along actual path 28. Referring to FIG. 8, reflectors 34a–e are markers that are disposed at predetermined locations along path 28. The distance between each of reflectors 34a–e is a variable highway design constraint. For example, the distance between each of reflectors 34a–e is approximately 50 feet in the State of California. Generally, automatic guidance control system 70 guides vehicle 8 in a generally forward direction along the forward, centerline axis of vehicle 8, which has been previously defined as vehicle heading 20. For the position of vehicle 8 shown in FIG. 8, heading angle 42 is determined with respect to reflector 34b, and heading angle 43 is determined with respect to reflector 34c. Minimum preview review distance 45 is defined as the radius of circle 50. Minimum preview review distance 45 is a distance projected from one of reflectors 34 and is defined as the radius of circle 50. The length of minimum preview review distance 45 is a function of the speed of vehicle 8. The actual values for minimum preview review distance 45 are determined by experimentation, because the selection of optimum values for minimum preview review distance 45 is a trade-off between ride comfort in the vehicle and control system performance. Consequently, the values determined for minimum preview review distance 45 must be compatible with both ride comfort and system performance. However, these values may be readily determined by system designers of ordinary skill. Finally, minimum preview review distance 45 must be sufficient to allow automatic guidance control system 70 sufficient reaction time to calculate heading angles 42 and 43, and the desired steering angle $\delta_d$ to be provided to steering servo system 18.

Figure 9:
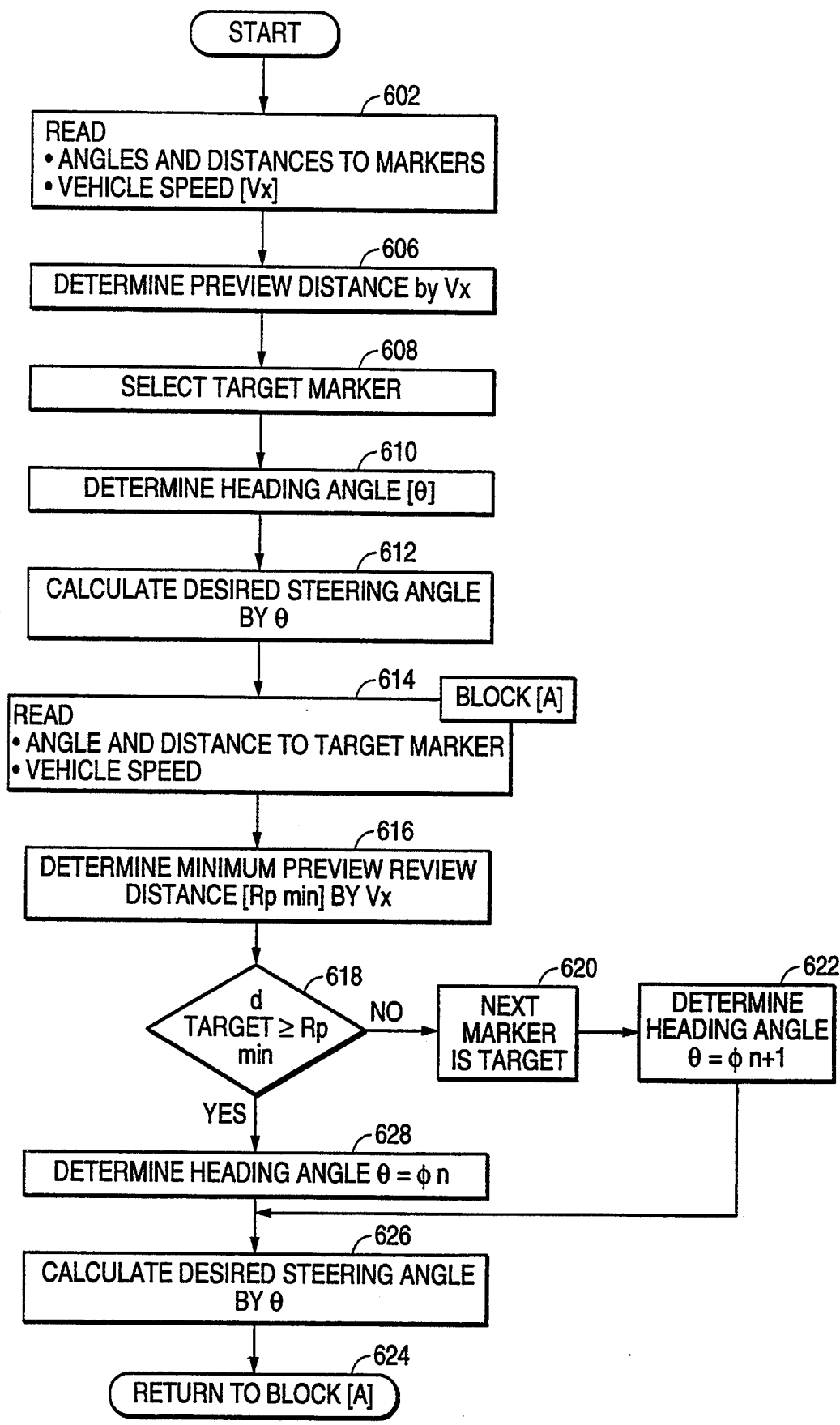
FIG. 9 illustrates a sequence of steps which may be performed to operate the improved automatic lateral guidance control system illustrated in FIGS. 7 and 8.

FIG. 9 illustrates a sequence of steps which may be performed by microcontroller 12 to operate the improved automatic lateral guidance control system illustrated in FIGS. 7 and 8. Referring to FIGS. 7, 8 and 9, blocks 602-628 disclose a sequence of steps to be performed by microcontroller 12 in order to calculate a desired steering angle from angle and distance measurements to a discrete marker (reflector 34). Starting at block 602, the angle and distance measurements from reflectors 34 (markers) are read in to microcontroller 12 from preview sensors 16. Preview sensors 16 measure the distance and angle between each of reflectors 34 and vehicle 8. The vehicle speed information from vehicle speed sensor 32 is also read in to microcontroller 12. In block 606, microcontroller 12 determines the length of preview distance 23 as a function of vehicle speed. The length of preview distance 23 is determined experimentally, as it was described above with respect to block 306 in FIG. 3. In block 608, microcontroller 12 selects an initial target marker (reflector 34b in this instance) by selecting a marker having the smallest distance value which is still greater than or equal to the length of preview distance 23. In block 610, microcontroller 12 then calculates heading angle 42. Heading angle 42 is the angle between vehicle heading 20 and a straight line from vehicle 8 to target marker 34b. Heading angle 42 may be calculated using the well-known mathematical techniques as disclosed above with respect to block 314 in FIG. 3. In block 612, microcontroller 12 calculates desired steering angle $\delta_d$ to be provided to steering servo system 18, based on heading angle 42. This step is performed by adjusting heading angle 42 to steer vehicle 8 towards target marker 34b. Consequently, microcontroller 12 must provide a desired steering angle as an output to steering servo system 18 that causes vehicle 8 to steer in the direction of target marker 34b. In other words, the desired steering angle is equal to the control gain K times heading angle 42. The control gain K is a function of vehicle speed and road curvature and will be described in greater detail below.

In block 614, microcontroller 12 reads in angle 42 and distance 44 with respect to reflector 34b. Reflector 34b is now referred to as the target marker. The vehicle speed is again read in from vehicle speed sensor 32. In block 616, microcontroller 12 then determines minimum preview review distance 45 as a function of vehicle speed. In block 618, microcontroller 12 compares distance 44 to minimum preview distance 45. If distance 44 (the distance to reflector 34b or the current target marker) is greater than or equal to minimum preview review distance 45, then the heading angle is then defined as heading angle 42. In block 628, microcontroller 12 then determines the magnitude of heading angle 42. In block 626, microcontroller 12 then calculates desired steering angle ($\delta_d$=control gain K times heading angle 42) to be provided to steering servo system 18.

On the other hand, in block 618, if distance 44 is leas than minimum preview review distance 45, then the next reflector 34c is selected as the target marker. Microcontroller 12 determines the next reflector by knowledge of the distance and angle measurements. Then, in block 622, microcontroller 12 determines the magnitude of heading angle 43 (the heading angle with respect to selected target marker 34c). The magnitude of heading angle 43 is then provided for the calculation of desired steering angle in block 626. As shown in FIG. 9, the process of selecting the next target marker and calculating a desired steering angle is then repeated by returning to block 614.

Figure 10:
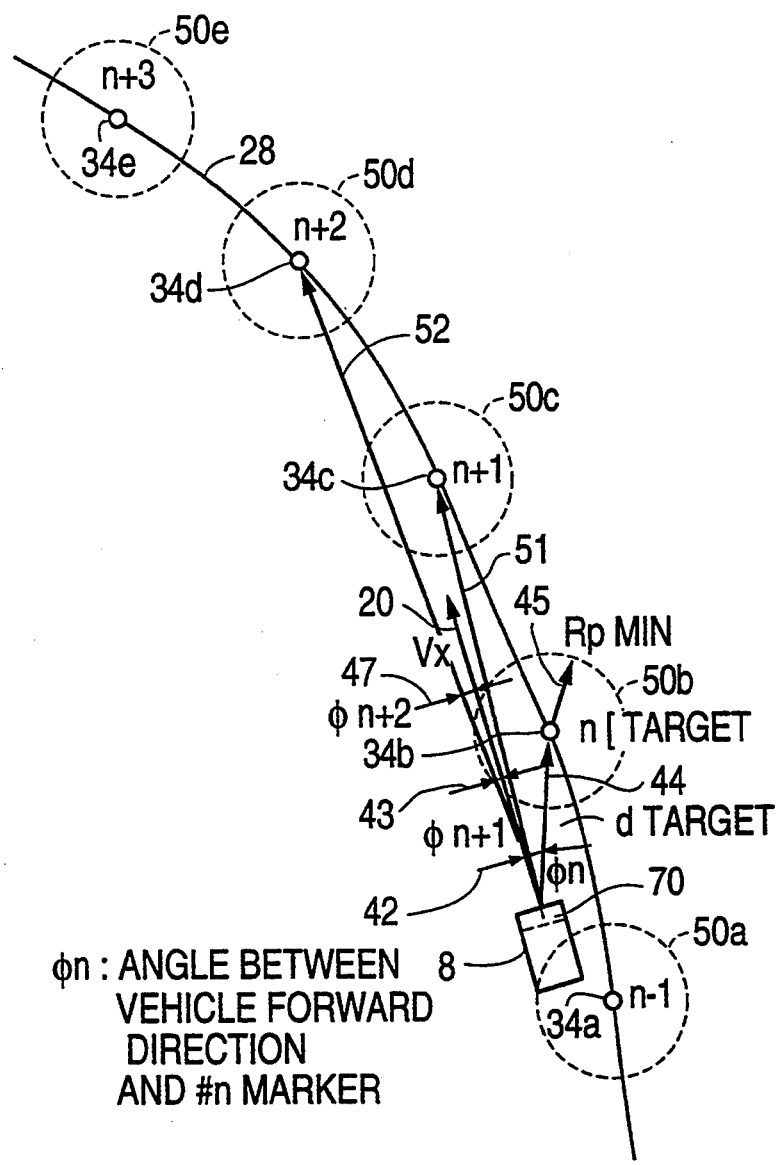
FIG. 10 illustrates an improved automatic lateral guidance control system in accordance with a third embodiment of the present invention.

FIG. 10 illustrates an improved automatic lateral guidance control system in accordance with a third embodiment of the present invention. The automatic lateral guidance control system disclosed with respect to the third embodiment comprises the structure of system 70 as shown in FIG. 7. Referring to FIGS. 7 and 10, FIG. 10 illustrates the improved automatic lateral guidance control system of FIG. 7 with vehicle 8 travelling along actual path 28. Reflectors 34a–e are disposed at predetermined locations adjacent to path 28. The distance between each of reflectors 34a–e is a variable highway design constraint. Generally, automatic guidance control system 70 guides vehicle 8 in a generally forward direction along the forward, centerline axis of vehicle 8, which has been previously defined as vehicle heading 20. For the position of vehicle 8 shown in FIG. 10, heading angle 42 is determined with respect to reflector 34b, heading angle 43 is determined with respect to reflector 34c, and heading angle 47 is determined with respect to reflector 34d. Minimum preview review distance 45 is defined as the radius of circle 50. Minimum preview review distance 45 is a distance projected from one of reflectors 34. The length of minimum preview review distance 45 is a function of the speed of vehicle 8 and is determined experimentally as described with respect to the above-discussed embodiments. The length of minimum preview review distance 45 must be sufficient to allow automatic guidance control system 70 sufficient reaction time to determine heading angles 42, 43 and 44 as they are being provided by preview sensor 16, and then to determine the desired steering angle to be provided to steering servo system 18.

Figure 11:
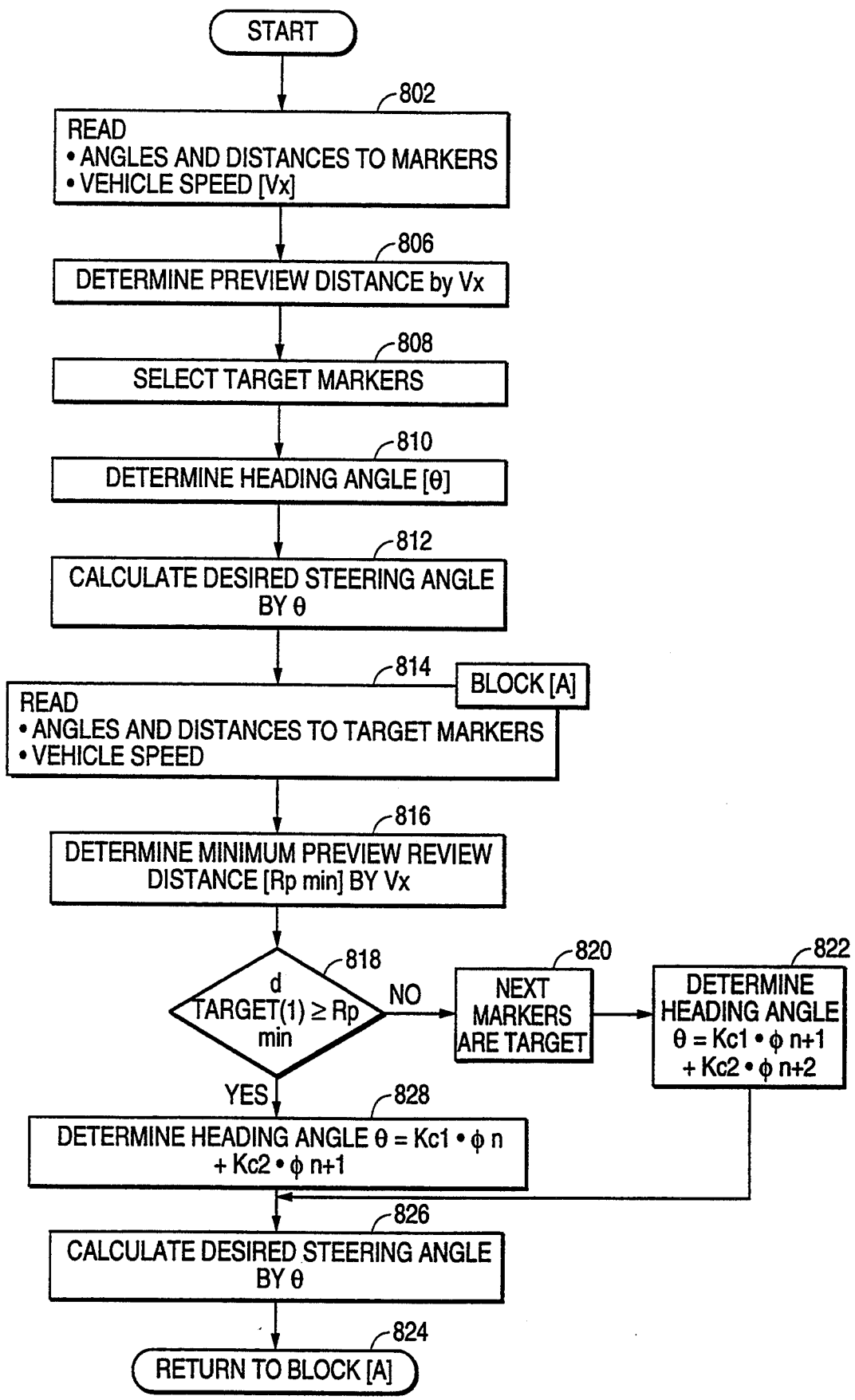
FIG. 11 illustrates a sequence of steps which may be performed to operate the improved automatic lateral guidance control system of FIG. 10.

FIG. 11 illustrates a sequence of steps which may be performed by microcontroller 12 to operate improved automatic lateral guidance control system 70 of FIGS. 7 and 10. In the embodiment illustrated in FIGS. 10 and 11, microcontroller 12 is attempting to determine heading angles with respect to two target markers or reflectors at a time. Thus, automatic lateral guidance control system 70 may still select at least one target marker and calculate a desired steering angle with respect to that marker even if one of the two reflectors or markers is missing from path 28, and angle and distance measurements to only one reflector is available at that point in time. Consequently, the system disclosed in the third embodiment is hereinafter referred to as a "fail-safe discrete marker system."

Referring to FIGS. 7, 10 and 11, the sequential steps performed by microcontroller 12 in blocks 802 through 816 are the same sequential steps as performed in blocks 602 through 616 in FIG. 9. Referring to block 818, microcontroller 12 compares distance 44 to minimum preview distance 45. If distance 44 (the distance from vehicle 8 to the current target marker or reflector 34b) is greater than or equal to minimum preview review distance 45, then the heading angle is defined as the sum of the weighted values of heading angles 42 and 43 as disclosed in block 828. The actual values for gains $K_{c1}$ and $K_{c2}$ are determined by experimentation, so that the resultant heading angle (the sum of heading angles 42 and 43 in this instance) is a weighted average of heading angles 42 and 43. In other words, the resultant heading angle has an angular value which is between the angular values of heading angles 42 and 43. This resultant heading angle is selected for optimum control system performance, and the values of $K_{c1}$ and $K_{c2}$ to provide the optimum heading angle are described in detail below. In block 828, microcontroller 12 then determines the magnitude of the heading angle defined as the sum of the weighted values of heading angles 42 and 43. In block 826, microcontroller 12 then calculates the desired steering angle to be provided to steering servo system 18, wherein the desired steering angle $\delta_d$ is equal to the control gain K times the value of the heading angle determined in block 828.

On the other hand, in block 818, if distance 44 is less than minimum preview review distance 45, then the next pair of reflectors (34c and 34d in this instance) are selected as the target markers. Then the heading angle is defined as the sum of the weighted values of heading angles 43 and 47. Then, in block 822, microcontroller 12 determines the magnitude of the sum of the weighted values of heading angles 43 and 47. The heading angle determined by block 822 is then provided for the step of calculating the desired steering angle in block 826, wherein the desired steering angle $\delta_d$ is equal to the control gain K times the value of the heading angle determined in block 822. As shown in FIG. 11, the process is then repeated by returning to block 814.

Referring now to FIG. 12, exemplary gain schedules for the discrete marker system are pictured schematically. As seen in FIG. 12(a), a constant single gain, $K_{c1}$, may be used for the 1-marker system described above with respect to the second embodiment of the present invention. Thus, when determining the desired steering angle of the vehicle as described above, control gain $K_{c1}$ is multiplied by heading angle 42 (FIG. 8). Similarly, for the 2-marker system, constant gains $K_{c1}$ and $K_{c2}$ may be used, as shown in FIG. 12(b). When a marker is located at a distance $r_p = 2\Delta s + R_{pmin}$ from the vehicle, it becomes "marker no. 2", with feedback gain $K_{c2}$. When a marker is located at leas than a distance $r_p = \Delta s + R_{pmin}$ from the vehicle, it becomes "marker no. 1", with feedback gain $K_{c1}$. With reference to FIG. 10, if the vehicle system shown were a 2-marker system, when the vehicle just enters $R_{pmin}$ (50a) of marker n−1, marker n+1 becomes "marker no. 2". When the vehicle is within the distance $R_{pmin}$ (50a) of marker n−1, marker n becomes "marker no. 1". Thus, the desired steering angle would be calculated as follows:

$$\delta_d = K_T(K_{c1}\theta_1 + K_{c2}\theta_2) \quad (8)$$

wherein $K_T$ is the control gain, or overall feedback gain of the system.

Figure 12A:
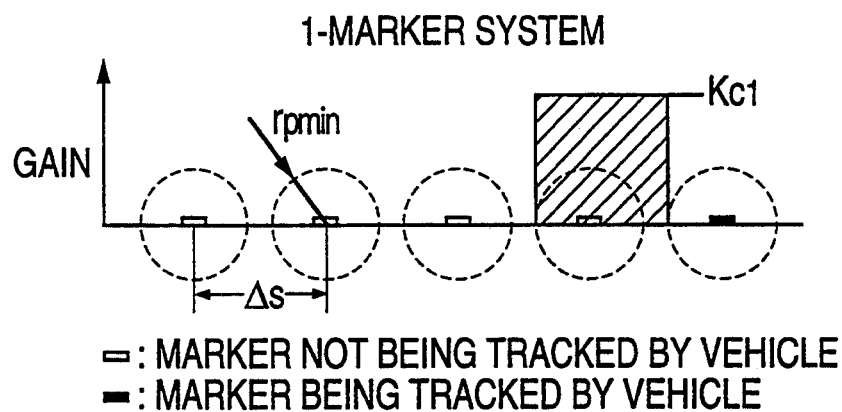
FIG. 12 illustrates various gain schedules for use with the automatic lateral guidance control systems of FIGS. 7, 8, 9, 10 and 11.
Figure 12B:
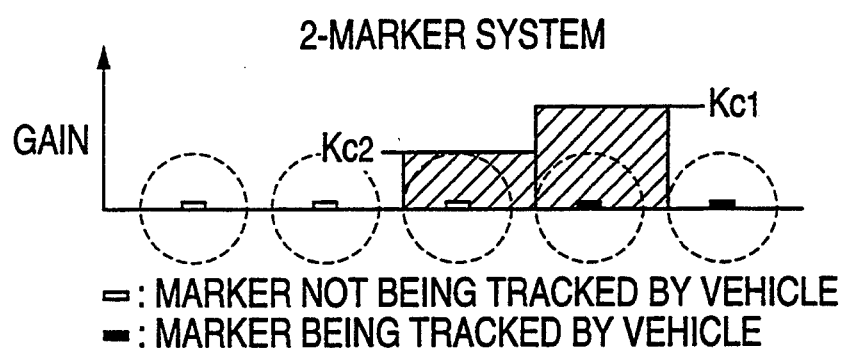
Figure 12C:
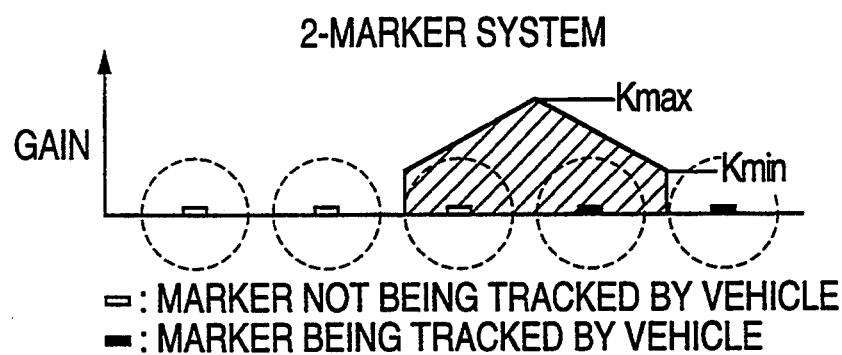
Figure 12D:
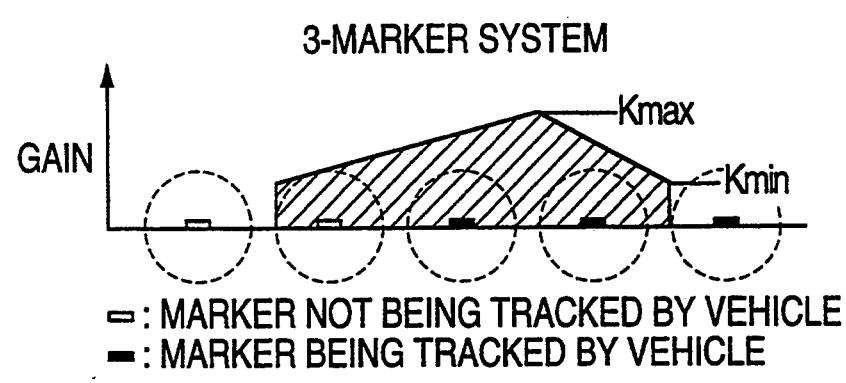

FIGS. 12(c) and 12(d) show a variable gain schedule for the 2- and 3- marker systems, respectively, where gain is defined as a linear function of $r_p$, or the distance from the vehicle to a specific marker. For the 2-marker system of FIG. 12(c), when marker no. 2 is first sensed, its gain, $K_{c2}$, is $K_{min}$. As the vehicle travels in a forward direction, the marker's gain increases to $K_{max}$, then diminishes back to $K_{min}$. Also, as the vehicle travels forward, the marker which was previously "marker no. 2" becomes "marker no. 1", while the marker that was previously "marker no. 1" has been passed by the vehicle and is no longer tracked. Gains $K_{C1}$ and $K_{C2}$ are calculated by the microcontroller as follows:

$$K_{c1} = K_{min} + (K_{max} - K_{min})\left(\frac{r_{p1} - r_{pmin}}{\Delta s}\right) \quad (9)$$

and, $$K_{c2} = K_{min} + (K_{max} - K_{min})\left(\frac{2\Delta s + r_{pmin} - r_{p2}}{\Delta s}\right) \quad (10)$$

Similarly, for the 3-marker system of FIG. 12(d), when marker no. 3 is first sensed, its gain, $K_{c3}$ is equal to $K_{min}$. As the vehicle travels in a forward direction, this gain increases to $K_{max}$, then diminishes to $K_{min}$. Also, as the vehicle travels forward, previous marker no. 3 becomes marker no. 2, previous marker no. 2 becomes marker no. 1, and previous marker no. 1 is passed and is no longer tracked by the system. A new marker is sensed, and becomes marker no. 3. The gains of the 3 markers $K_{c1}$, $K_{c2}$ and $K_{c3}$ are calculated by the microcontroller 12 as follows:

$$K_{c1} = K_{min} + (K_{max} - K_{min})\left(\frac{r_{p1} - r_{pmin}}{\Delta s}\right) \quad (11)$$

$$K_{c2} = K_{min} + (K_{max} - K_{min})\left(\frac{3\Delta s + r_{pmin} - r_{p2}}{2\Delta s}\right) \quad (12)$$

$$K_{c3} = K_{min} + (K_{max} - K_{min})\left(\frac{3\Delta s + r_{pmin} - r_{p3}}{2\Delta s}\right) \quad (13)$$

Finally, the desired steering angle, $\delta d$, is calculated as follows:

$$\delta d = K_t(K_{c1}\theta_1 + K_{c2}\theta_2 + K_{c3}\theta_3) \quad (14)$$

where $\theta$ is the measured angle to the nth marker, and $K_T$ is the overall feedback gain. The angle $\theta_1$ corresponds to the marker nearest to the vehicle, while $\Theta_3$ corresponds to the marker farthest from the vehicle. As the vehicle travels forward and $R_{pmin}$ to the nearest marker (marker no. 1) is reached, that marker is no longer tracked by the system, previous marker no. 2 becomes marker no. 1, previous marker no. 3 becomes marker no. 2 and new marker no. 3 is sensed by the system.

Figure 13:
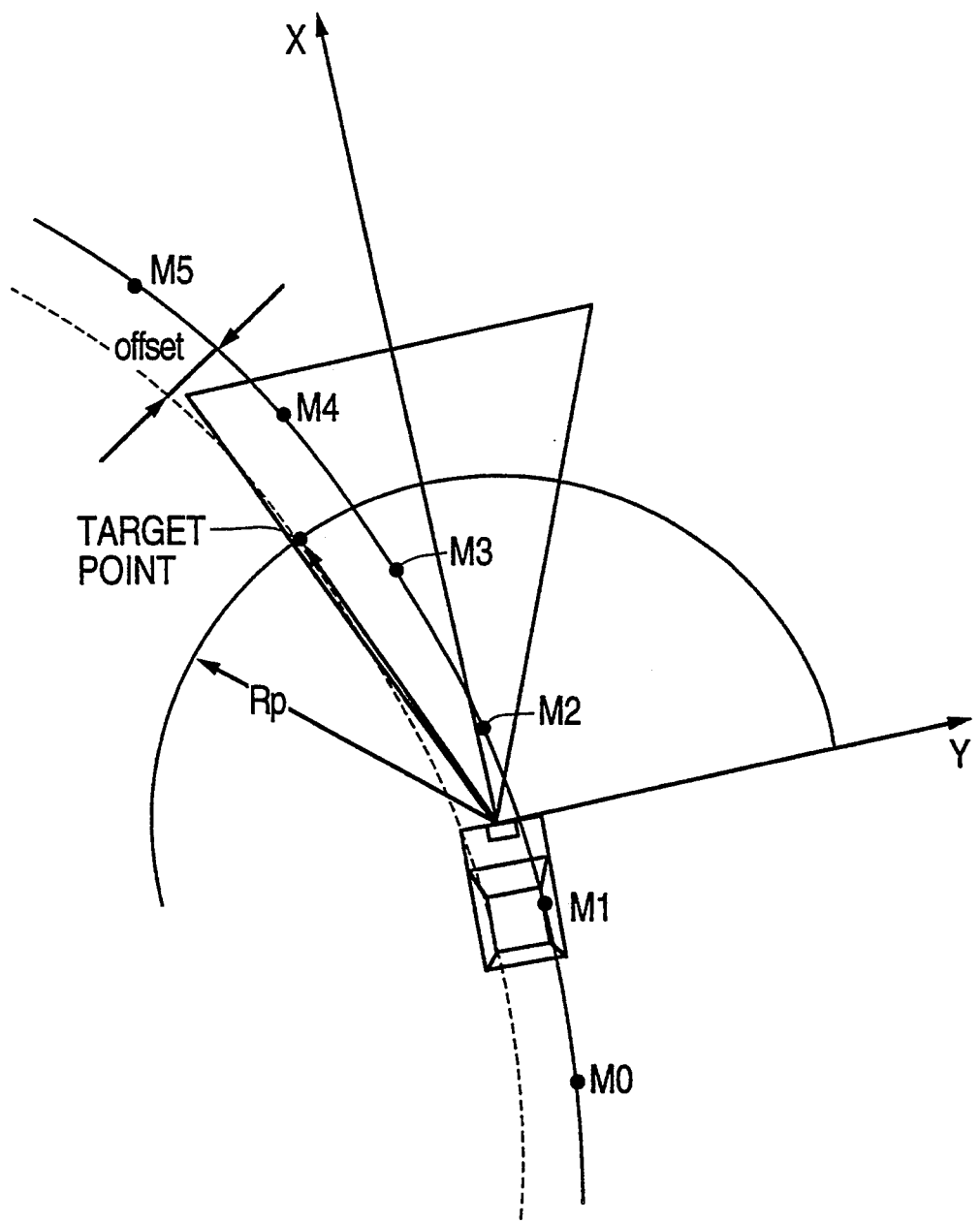
FIG. 13 schematically illustrates a use of a comfort factor in accordance with the present invention.
Figure 14:
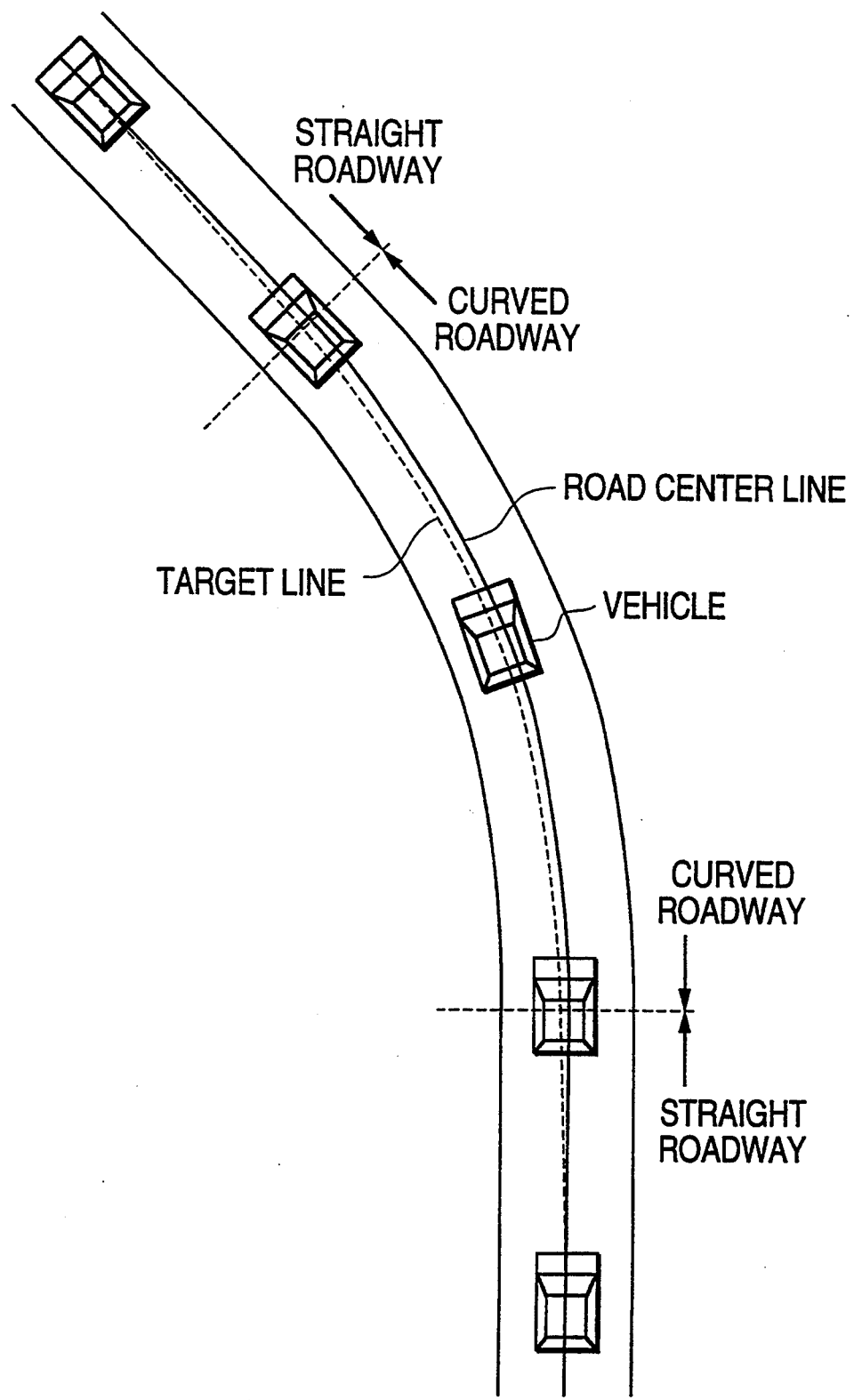
FIG. 14 schematically illustrates a relationship between the comfort factor of FIG. 13 and the curvature of the road.

Typically, the path on which a vehicle travels is curved. Consequently, a passenger of the vehicle may feel some mental and/or physical discomfort if there is an insufficient margin of distance between the shoulder or outer margin of the path, and the vehicle. FIGS. 13 and 14 schematically illustrate the provision of a human engineering factor which compensates for human psychological and physiological comfort in the vehicle guidance system of the present invention.

Referring to FIG. 13, after road geometry is estimated in accordance with the present invention, the system shifts the target point an offsetting amount toward the inside curve of the road. This offset will, of course, depend upon such factors as the speed of the vehicle, the degree of curvature of the road, the width of the road and the individual preference of the passengers. For example, an offset of 0.5 to 1.0 meter may be appropriate for a 4 meter wide road. FIG. 14 illustrates how the offset may vary depending upon the curvature of the road. Under the control of microcontroller 12, the system causes the vehicle to be centered on the target line. When microcontroller 12 shifts the target point, a greater margin of distance will be provided between the target line and the road center for a curved roadway than for a straight roadway. Thus, a greater margin of distance is provided between the vehicle and the outside shoulder of the curved roadway, and a lesser margin of distance is provided between the vehicle and the shoulder of the straight roadway. Of course, this human comfort control factor may be incorporated into any or all of the embodiments contemplated by the present invention.

This invention has been described in detail in connection with the preferred embodiments but is for illustrative purposes only and the invention is not limited thereto. It will be easily understood by those skilled in the art that variations and modifications can easily be made within the scope of this invention as defined by the appended claims.

We claim:

1. An apparatus for automatically guiding a moving vehicle with respect to a road having a plurality of markers positioned therealong, said apparatus comprising:
    means for sensing the position, relative to said vehicle, of a predetermined number of said markers and for generating position signals in response thereto;
    means for calculating a path approximating said road in accordance with position signals representing both the present position of said vehicle with respect to said road, and a past position of said vehicle with respect to said road;
    means for sensing the speed of said vehicle and for generating speed signals in response thereto;
    means for calculating a preview distance as a function of the speed of said vehicle in accordance with said speed signals;
    means for identifying a point along said approximate path that is spaced apart from said vehicle by said preview distance; and
    means for generating a control signal for use in steering said vehicle substantially toward said point such that said vehicle is guided substantially along said road.

2. The apparatus according to claim 1, further comprising means for sensing the yaw rate of said vehicle and for generating yaw rate signals in response thereto, wherein said means for calculating a path utilizes said yaw rate signals to calculate said path.

3. The apparatus according to claim 1, wherein said means for calculating a path, means for calculating a preview distance, means for identifying a point and means for generating a control signal comprises a processing unit.

4. The apparatus according to claim 3, wherein said processing unit comprises a computing apparatus.

5. The apparatus according to claim 3 wherein said processing unit comprises a microcontroller.

6. The apparatus according to claim 1, further comprising means for calculating the angle formed between the heading of said vehicle and a straight line from vehicle to said point, and wherein said means for generating a control signal utilizes said calculated angle.

7. The apparatus according to claim 1, further comprising means for multiplying said control signal by a gain factor determined by the vehicle speed and the curvature of said road.

8. The apparatus according to claim 1, further comprising means for shifting said point an offsetting amount, said amount being determined, at least in part, by the curvature of said road, in order to provide a margin of distance between said vehicle and an edge of said road.

9. The apparatus according to claim 1, further comprising steering means responsive to said control signal for steering said vehicle.

10. The apparatus according to claim 1, wherein said predetermined number of markers is at least three.

11. The apparatus according to claim 1 wherein said position sensing means comprises an optical sensing apparatus.

12. The apparatus according to claim 11, wherein said optical sensing apparatus comprises a laser radar apparatus.

13. An apparatus for automatically guiding a moving vehicle with respect to a road having a plurality of markers positioned therealong, said apparatus comprising:
    means for designating a first predetermined number of markers from said plurality of markers as selected markers;
    means for sensing the position, relative to said vehicle, of each of said first predetermined number of markers and for generating position signals in response thereto;
    means for sensing the speed of said vehicle and for generating speed signals in response thereto;
    means for calculating a minimum preview review distance as a function of the speed of said vehicle in accordance with said speed signals;
    means for comparing the distance between said vehicle and the position of the nearest marker of said first predetermined number of markers to said vehicle with said minimum preview review distance and for designating a second predetermined number of markers from said plurality of markers as said selected markers if the distance between said vehicle and the position of said nearest marker of said first predetermined number of markers is equal to or exceeds said minimum preview review distance;
    means for calculating a gain factor as a function of the distance between said vehicle and each of said selected markers;
    means responsive to said gain factor for generating a control signal for use in steering said vehicle substantially toward a point along a path that is located between the nearest and furthest of said selected markers to said vehicle such that said vehicle is guided substantially along said road.

14. The apparatus according to claim 13, wherein said predetermined number of markers is one marker and said point along a path coincides with said selected marker.

15. The apparatus according to claim 13, wherein said predetermined number of markers is at least two adjacent markers.

16. The apparatus according to claim 13, wherein said means for calculating a minimum preview review distance, means for comparing and designating, means for calculating a gain factor and means for generating a control signal comprises a processing unit.

17. The apparatus according to claim 13, further comprising means for calculating the angle formed between the heading of said vehicle and a straight line from vehicle to said point, and wherein said means for generating a control signal utilizes said angle.

18. The apparatus according to claim 13, further comprising means for multiplying said control signal by a gain factor determined by the vehicle speed and the curvature of said road.

19. The apparatus according to claim 13, further comprising means for shifting said point an offsetting amount, said amount being determined, at least in part, by the curvature of said road, in order to provide a margin of distance between said vehicle and an edge of said road.

20. The apparatus according to claim 13, further comprising steering means responsive to said control signal for steering said vehicle.

21. A method for automatically guiding a moving vehicle with respect to a road having a plurality of markers positioned therealong, said method comprising the steps of:
    designating a first predetermined number of markers from said plurality of markers as selected markers;
    sensing the position, relative to said vehicle, of each of said first predetermined number of markers and generating position signals in response thereto;
    sensing the speed of said vehicle and generating speed signals in response thereto;
    calculating a minimum preview review distance as a function of the speed of said vehicle in accordance with said speed signals;
    comparing the distance between said vehicle and the position of the nearest marker of said first predetermined number of markers to said vehicle with said minimum preview review distance and for designating a second predetermined number of markers from said plurality of markers as said selected markers if the distance between said vehicle and the position of said nearest marker is equal to or exceeds said minimum preview review distance;
    calculating a gain factor as a function of the distance between said vehicle and each of said selected markers; and
    generating a control signal for use in steering said vehicle substantially toward a point along a path that is located between the nearest and furthest of said selected markers from said vehicle utilizing said gain factor so as to guide said vehicle substantially along said road.

22. The method according to claim 21, wherein said predetermined number of markers is one marker and said point along a path coincides with said selected marker.

23. The apparatus according to claim 21, wherein said predetermined number of markers is at least two adjacent markers.

24. The method according to claim 21, further comprising the steps of:
    calculating the angle formed between the heading of said vehicle and a straight line from vehicle to said point; and
    utilizing said calculated angle to generate said control signal.

25. The method according to claim 21, further comprising the step of multiplying said control signal by a gain factor determined by the vehicle speed and the curvature of said road.

26. The method according to claim 21, further comprising the step of shifting said point an offsetting amount, said amount being determined, at least in part, by the curvature of said road, in order to provide a margin of distance between said vehicle and an edge of said road.

27. The method according to claim 21, further comprising the step of steering said vehicle in accordance with said control signal.

28. A method for automatically guiding a moving vehicle with respect to a road having a plurality of markers positioned therealong, said method comprising the steps of:
    sensing the position, relative to said vehicle, of a predetermined number of said markers and generating position signals in response thereto;
    calculating a path approximating said road in accordance with position signals representing both the present position of said vehicle with respect to said road, and a past position of said vehicle with respect to said road;
    sensing the speed of said vehicle and generating speed signals in response thereto;
    calculating a preview distance as a function of the speed of said vehicle in accordance with said speed signals;
    identifying a point along said approximate path that is spaced apart from said vehicle by said preview distance; and
    generating a control signal for use in steering said vehicle substantially toward said point so as to guide said vehicle substantially along said road.

29. The method according to claim 28, further comprising the steps of:
    sensing the yaw rate of said vehicle and generating yaw rate signals in response thereto; and
    utilizing said yaw rate signals to calculate said path.

30. The method according to claim 28, further comprising the steps of:
    calculating the angle formed between the heading of said vehicle and a straight line from vehicle to said point; and
    utilizing said calculated angle to generate said control signal.

31. The method according to claim 28, further comprising the step of multiplying said control signal by a gain factor determined by the vehicle speed and the curvature of said road.

32. The method according to claim 28, further comprising the step of shifting said point an offsetting amount, said amount being determined, at least in part, by the curvature of said road, in order to provide a margin of distance between said vehicle and an edge of said road.

33. The method according to claim 28, further comprising the step of steering said vehicle in accordance with said control signal.

34. The method according to claim 28, wherein said predetermined number of markers is at least three.

* * * * *